(12) United States Patent
Satani et al.

(10) Patent No.: US 11,964,511 B2
(45) Date of Patent: Apr. 23, 2024

(54) CASTER PROTECTION STRUCTURE, HOUSING STRUCTURE EQUIPPED WITH CASTER PROTECTION STRUCTURE, AND ARTICLE

(71) Applicant: FUJIFILM Business Innovation Corp., Tokyo (JP)

(72) Inventors: Maho Satani, Kanagawa (JP); Taisuke Endo, Kanagawa (JP); Keigo Shinoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 29 days.

(21) Appl. No.: 17/569,458

(22) Filed: Jan. 5, 2022

(65) Prior Publication Data
US 2023/0057292 A1     Feb. 23, 2023

(30) Foreign Application Priority Data

Aug. 23, 2021   (JP) .................................. 2021-135474

(51) Int. Cl.
*B60B 33/00*      (2006.01)
*B62B 5/00*       (2006.01)

(52) U.S. Cl.
CPC ........ *B60B 33/0002* (2013.01); *B62B 5/0006* (2013.01)

(58) Field of Classification Search
CPC . B60B 33/0002; B60B 2200/20; B60R 19/00; B60R 19/02; B60R 19/56; B60R 19/565; B62B 5/0006; B62B 2301/04; B62B 2301/34; B62B 2900/212
See application file for complete search history.

(56) References Cited

U.S. PATENT DOCUMENTS

| | | | | |
|---|---|---|---|---|
| 2,483,241 | A | * | 9/1949 | Shepherd ................ B60B 33/00 16/18 CG |
| 2,947,548 | A | * | 8/1960 | Bard ....................... A47L 13/48 280/79.2 |
| 2,986,419 | A | * | 5/1961 | Barenyi .................. B60R 19/42 293/121 |
| 3,110,515 | A | * | 11/1963 | Loftin .................... B60R 19/42 293/127 |
| 3,721,315 | A | * | 3/1973 | Wehner .................. A47C 12/02 182/15 |
| 4,055,362 | A | * | 10/1977 | Becker, III ............ B62B 5/0006 293/121 |

(Continued)

FOREIGN PATENT DOCUMENTS

| | | | | |
|---|---|---|---|---|
| DE | 202009009056 U1 | * | 12/2009 | ......... B60B 33/0002 |
| JP | 2003219916 A | * | 8/2003 | |

(Continued)

*Primary Examiner* — Steve Clemmons
(74) *Attorney, Agent, or Firm* — JCIPRNET

(57) ABSTRACT

A caster protection structure protects a caster provided at a base of a housing and used for transporting the housing in a movable manner, and includes a frame member that is provided at the base of the housing, serves as a part of a frame constituting the base of the housing, and extends in a predetermined direction. A longitudinal end position of the frame member is disposed in an outer region located beyond an outer lateral edge position of the caster.

12 Claims, 8 Drawing Sheets

(56) References Cited

U.S. PATENT DOCUMENTS

| | | | | |
|---|---|---|---|---|
| 4,203,609 A * | 5/1980 | Mitchell | B62D 13/04 | 108/55.3 |
| 4,635,951 A * | 1/1987 | Berfield | B62B 5/0006 | 280/79.5 |
| 4,700,430 A * | 10/1987 | Raftery | A47B 91/06 | 16/42 R |
| 5,152,542 A * | 10/1992 | DeVoe | B62B 3/02 | 280/79.11 |
| 5,371,920 A * | 12/1994 | Rainville | B60B 33/0028 | 128/203.12 |
| 5,823,586 A * | 10/1998 | Marley | B60R 19/00 | 293/126 |
| 6,125,504 A * | 10/2000 | Richards | B60B 33/00 | 16/18 CG |
| 6,507,975 B2 * | 1/2003 | Maupin | B60B 33/0057 | 16/34 |
| 8,484,801 B2 * | 7/2013 | Li | B60B 33/063 | 16/18 CG |
| 8,693,916 B2 * | 4/2014 | Masuda | G03G 21/16 | 248/351 |
| 8,904,597 B2 * | 12/2014 | Long | B60B 33/0023 | 16/18 CG |
| 8,985,328 B2 * | 3/2015 | Slaats | A47F 5/0018 | 108/51.11 |
| 8,985,649 B2 * | 3/2015 | Lutz | B62B 5/0006 | 293/120 |
| 9,669,655 B1 * | 6/2017 | Soliman | B60B 7/04 | |
| 9,731,739 B2 * | 8/2017 | Marler | A47B 91/002 | |
| 9,981,619 B1 * | 5/2018 | Deng | B60R 19/00 | |
| 10,011,290 B2 * | 7/2018 | Abel | B62B 3/005 | |
| 10,035,483 B2 * | 7/2018 | Wylezinski | B60R 19/56 | |
| 10,093,335 B2 * | 10/2018 | Thuma | B62B 3/005 | |
| 10,279,994 B2 * | 5/2019 | Russell | B65F 1/1473 | |
| 11,485,575 B2 * | 11/2022 | Dooley | B65G 1/0492 | |
| 2003/0201619 A1 * | 10/2003 | Teng | B60B 33/0002 | 280/79.11 |
| 2014/0132129 A1 * | 5/2014 | Deneweth | A47B 77/04 | 312/249.8 |

FOREIGN PATENT DOCUMENTS

| | | |
|---|---|---|
| JP | 2012-038826 | 2/2012 |
| JP | 2012224279 A * | 11/2012 |
| KR | 102228944 B1 * | 3/2021 |

* cited by examiner

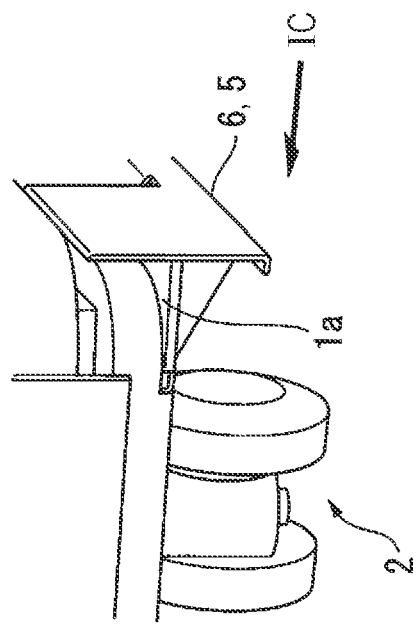
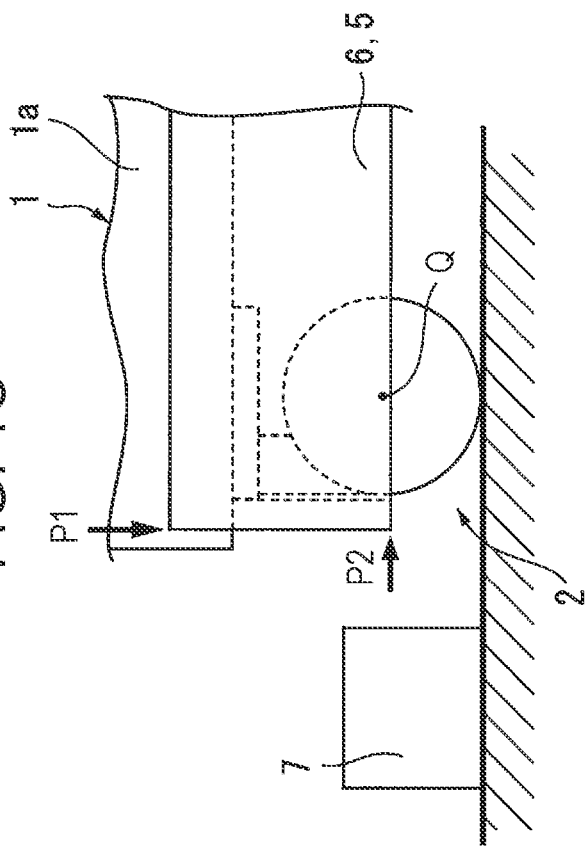
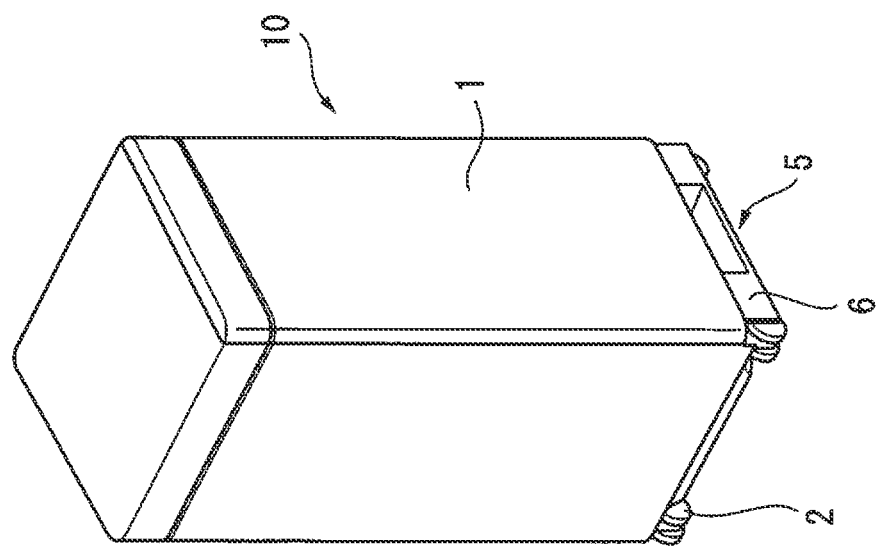

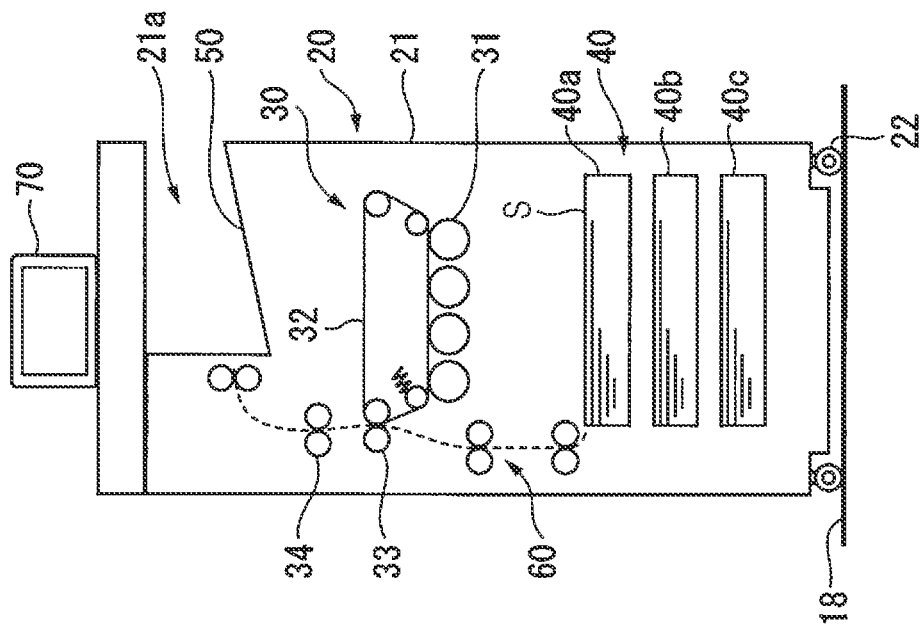

CASTER PROTECTION STRUCTURE, HOUSING STRUCTURE EQUIPPED WITH CASTER PROTECTION STRUCTURE, AND ARTICLE

CROSS-REFERENCE TO RELATED APPLICATIONS

This application is based on and claims priority under 35 USC 119 from Japanese Patent Application No. 2021-135474 filed Aug. 23, 2021.

BACKGROUND (i) Technical Field

The present disclosure relates to caster protection structures for protecting casters used for transporting articles in a movable manner, housing structures equipped with the caster protection structures, and articles.

(ii) Related Art

Japanese Unexamined Patent Application Publication No. 2012-38826 (Detailed Description, FIG. 5) discloses a known caster protection structure of this type in the related art.

A caster protection device disclosed in Japanese Unexamined Patent Application Publication No. 2012-38826 is provided with bowl-shaped caster covers that widen from the floor toward the base of the device to surround rollers provided at the base of the device. Each caster cover is provided with a caster cover base that is disposed between the rotation center of the roller and the floor and that faces the floor.

SUMMARY

Aspects of non-limiting embodiments of the present disclosure relate to reducing damage to caster protection members during a collision with an obstacle when an article is being transported, as compared with a case where casters are surrounded and covered by protection members.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a caster protection structure that protects a caster provided at a base of a housing and used for transporting the housing in a movable manner, the caster protection structure including: a frame member that is provided at the base of the housing, serves as a part of a frame constituting the base of the housing, and extends in a predetermined direction, wherein a longitudinal end position of the frame member is disposed in an outer region located beyond an outer lateral edge position of the caster.

BRIEF DESCRIPTION OF THE DRAWINGS

Exemplary embodiments of the present disclosure will be described in detail based on the following figures, wherein:

FIG. 1A schematically illustrates an article equipped with a housing structure according to an exemplary embodiment of the present disclosure, FIG. 1B illustrates a caster protection structure used in this exemplary embodiment, and FIG. 1C is a diagram as viewed from a direction indicated by an arrow IC in FIG. 1B;

FIG. 2A is an external view of an image forming device as an article according to a first exemplary embodiment, and FIG. 2B schematically illustrates the overall configuration of the image forming device shown in FIG. 2A;

DETAILED DESCRIPTION

General Outline of Exemplary Embodiment

Figure 3:
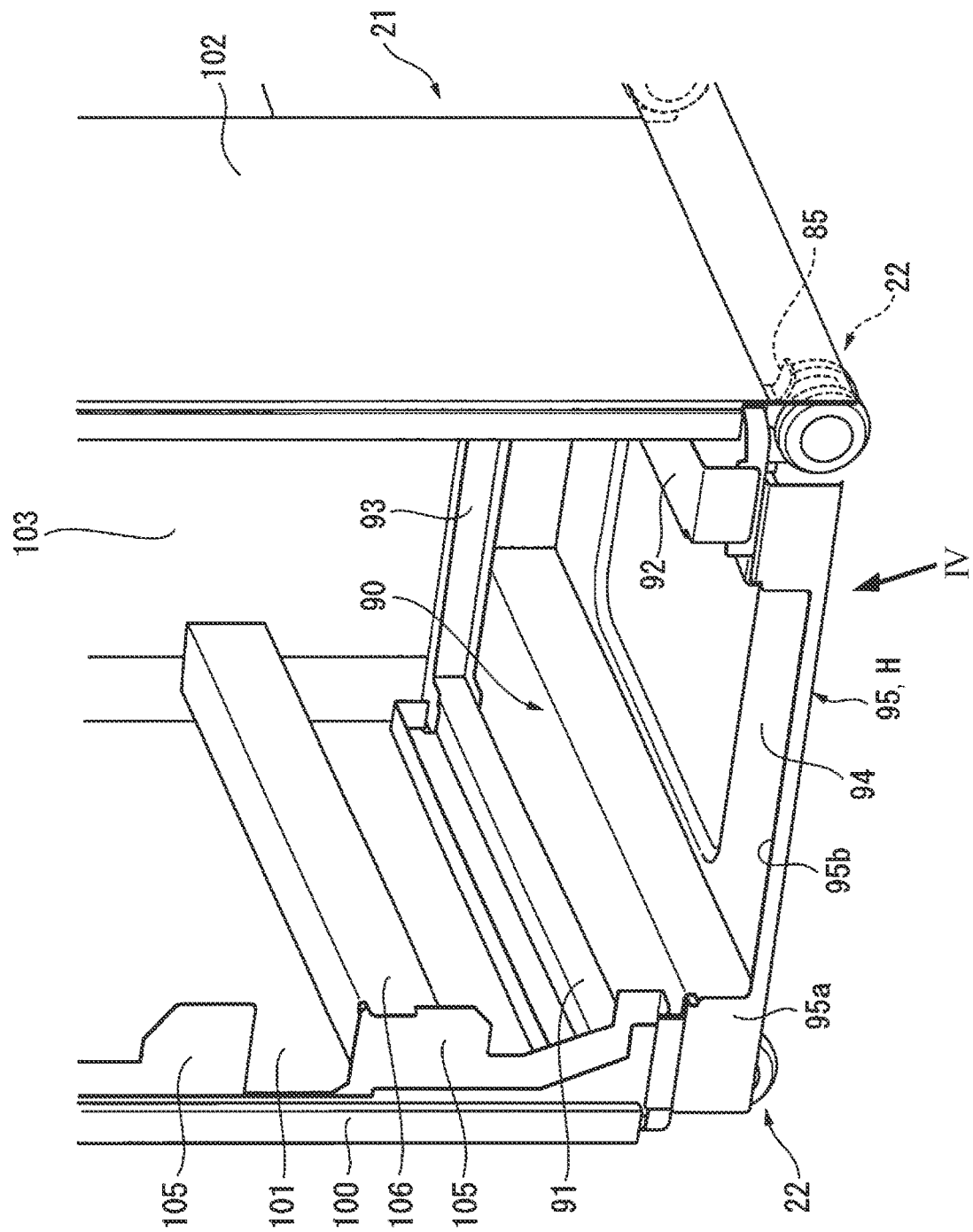
FIG. 3 illustrates a housing structure surrounding each caster of the image forming device according to the first exemplary embodiment.
Figure 4:
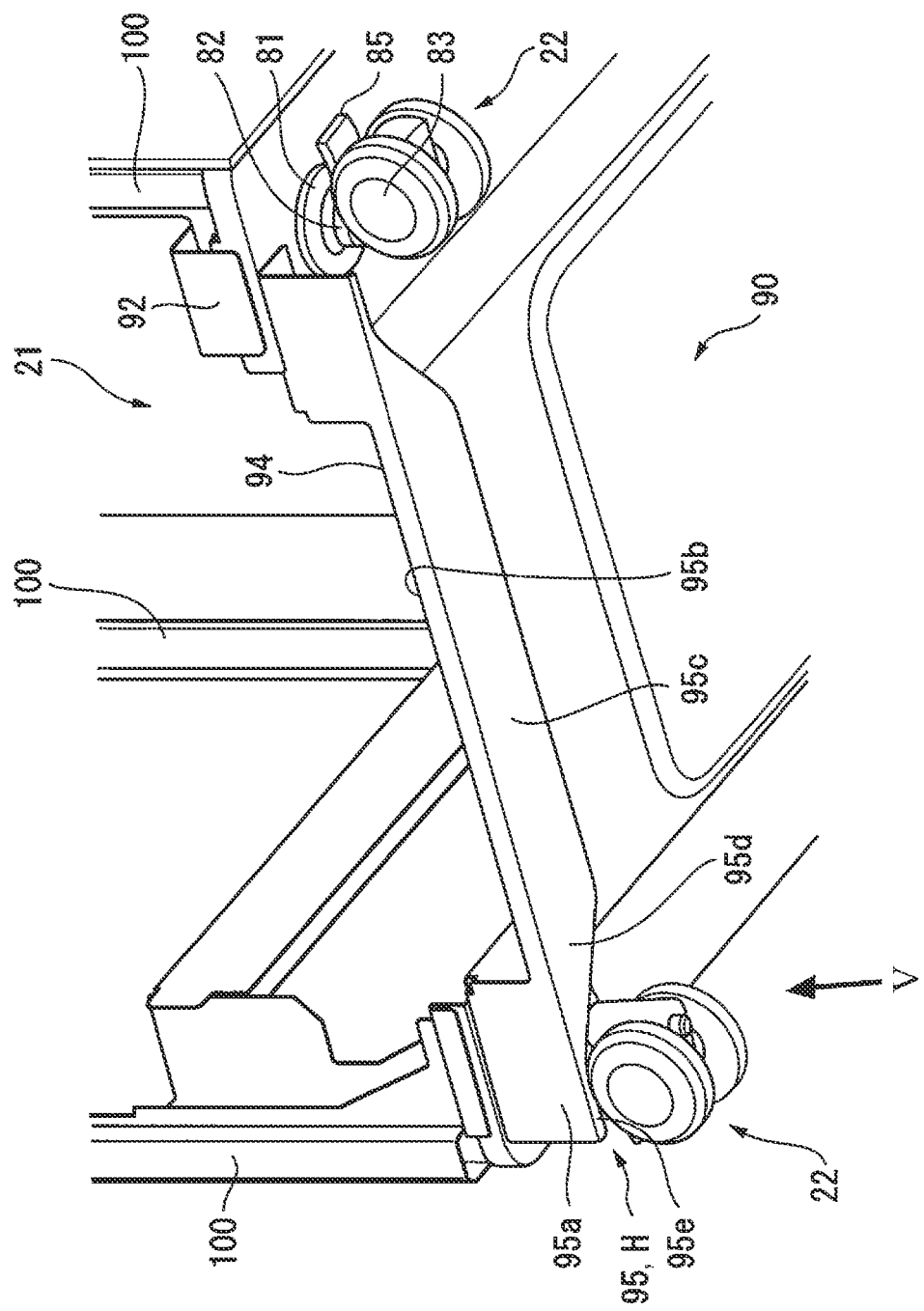
FIG. 4 is a diagram as viewed from a direction indicated by an arrow IV in FIG. 3.

FIG. 1A schematically illustrates an article equipped with a housing structure according to an exemplary embodiment of the present disclosure.

In FIG. 1A, an article 10 is equipped with a housing structure including a housing 1, casters 2 provided at a base 1a of the housing 1 and used for transporting the housing 1 in a movable manner, and a protector 5 that protects the casters 2. The housing structure is loaded with various types of article components (not shown).

In this example, as shown in FIGS. 1B and 1C, the protector 5 has frame members 6 serving as parts of a frame that constitutes the base 1a of the housing 1 and extending in a predetermined direction. A longitudinal end position of each frame member 6 is disposed in an outer region located beyond an outer lateral edge position of the corresponding caster 2.

In this technical configuration, it is assumed that the term "article 10" widely includes a multifunction device having a combination of, for example, a photocopying function, a printing function, a scanning function, and a facsimile function, or a product, such as a household electric appliance or a furniture. In particular, the article 10 is to be transported in a movable manner to an installation location by using the casters 2.

The term "caster 2" widely includes a movable member, is not limited to a two-wheel caster having a pair of wheels retained by a rotatable wheel holder via a shaft, and may include a ball-type caster that uses a ball in place of wheels.

Furthermore, although each caster 2 is movable in any direction, since the principal traveling direction of the caster 2 is determined by the transporter, the caster 2 is designed in view of the principal traveling direction thereof on the basis of the work of the transporter.

For example, the housing 1 is normally rectangular in cross section, and is often designed such that a direction parallel to any one of the outer side surfaces of the housing 1 is set as the principal traveling direction. There may be a case where handles to be held for lifting the article 10 are provided for transporting the article 10. In such a case, the handles are disposed on two opposite surfaces (e.g., left and right side surfaces) in principle. However, in view of the fact that the article 10 is to be lifted when the article 10 is to be transported, it is natural that the surfaces on which the handles are disposed be located at the front and rear sides of the article 10 in the traveling direction thereof. Accordingly, the casters 2 may be designed in view of the principal traveling direction of the casters 2.

The frame includes the frame members 6 (also including tie rods) that are to be joined together, and also includes a plate member that closes the space between the frame members 6. The frame members 6 may be plate members having various types of cross-sectional shapes, or may be closed-cross-sectional pipe members.

In this example, the protector 5 serves as a protection structure for each caster 2 by using the corresponding frame member 6. Specifically, as shown in FIGS. 1B and 1C, the protector 5 is designed to use the frame member 6 extending in the predetermined direction such that when the caster 2 collides with an obstacle 7, the frame member 6 collides therewith simultaneously with the caster 2. However, considering that the article 10 may travel diagonally or may have a dimensional error, the frame member 6 may be designed to collide with the obstacle 7 before the caster 2. In order to achieve this, the frame member 6 may be disposed in front of the caster 2 in the traveling direction by 10 mm or smaller, or preferably, by 5 mm or smaller. The predetermined direction representatively extends along any one of the outer side surfaces of the housing 1 but is not limited thereto. The predetermined direction may include a diagonal direction that intersects at an acute angle with the direction extending along the outer side surface of the housing 1. However, if the intersection angle is too large, a lateral component of the impact force in the direction traversing the frame member 6 increases, possibly causing the frame member 6 to deform due to the impact. Thus, this point may be taken into consideration.

Accordingly, the impact force is distributed so that deformation of the caster 2 may be suppressed. In particular, even if each longitudinal end of the frame member 6 has a plate-like configuration, the impact during the collision with the obstacle 7 is received in the longitudinal direction, so that the rigidity of the frame member 6 is higher than that of the caster 2, whereby the impact force applied to the caster 2 may be attenuated.

Next, a representative example of a caster protection structure according to this exemplary embodiment will be described.

Referring to FIG. 1C, as one example of each frame member 6, a longitudinal end position P1 of the frame member 6 may be disposed outward relative to an outer lateral edge position of the corresponding caster 2. In this example, the span between the longitudinal end position P1 of the frame member 6 and the outer lateral edge position of the caster 2 is set in a range larger than an assembly error so that the frame member 6 is caused to collide with the obstacle 7 before the caster 2 instead of causing the caster 2 alone to collide with the obstacle 7.

As another example of each frame member 6, each longitudinal end of the frame member 6 may be disposed with a distance from the corresponding caster 2 such that the frame member 6 is non-contactable with the caster 2 when the caster 2 rotates in any direction. This example is effective for ensuring the movement of the caster 2 in any direction.

As another example of each frame member 6, the frame member 6 may be provided along one edge of the base 1a of the housing 1 and be located at the outer side of the casters 2 with respect to a direction intersecting the longitudinal direction of the frame member 6. In this example, the casters 2 may be hidden laterally by the frame member 6 located at the outer side of the casters 2, and lateral protection may be achieved in addition to the protection provided by the longitudinal ends of the frame member 6 against the obstacle 7.

As another example of the frame members 6, the casters 2 may be provided at corners of the base 1a of the housing 1, the base 1a of the housing 1 may have a recess (not shown) recessed downward in a region between the casters 2, and the frame members 6 may each have a U-shaped cutout surrounding the recess and extending in the longitudinal direction. The recess is used as an accommodation section of a medium feeder, such as a sheet feeder.

As another example of each frame member 6, the casters 2 may be provided at opposite corners on one edge of the base 1a of the housing 1 and be protected by the longitudinal ends of the frame member 6. In this example, a structure for protecting multiple casters 2 with a single frame member 6 is realized.

Furthermore, referring to FIG. 1C, with regard to the layout of each frame member 6, a lower end position P2 of each longitudinal end of the frame member 6 may be disposed in a lower region below a center position Q of the corresponding caster 2. In this example, the frame member 6 may be prevented from becoming a hindrance to the caster 2 moving over an obstacle 7 with a small height, and the protection range for the caster 2 against the obstacle 7 may be increased.

In particular, in this example, from the viewpoint of reducing the possibility of the frame member 6 becoming a hindrance to the caster 2 moving over the obstacle 7 and protecting the caster 2 as much as possible, the lower end position P2 of the longitudinal end of the frame member 6 may be disposed downward relative to the center position Q of the caster 2.

Exemplary embodiments illustrated in the appended drawings will be described below in further detail.

First Exemplary Embodiment

FIG. 2A illustrates the overall configuration of an image forming device as an article according to a first exemplary embodiment.

Overall Configuration of Image Forming Device

In FIG. 2A, an image forming device 20 is equipped with a housing structure including a device housing 21 and multiple casters 22 provided at four corners of a base of the device housing 21 and used for transporting the device housing 21 in a movable manner. The housing structure is loaded with components used for image formation as various types of article components.

In this example, the device housing 21 substantially has a vertical-long rectangular parallelepiped shape. Assuming that the side where a user operates the device is defined as the front side, the device housing 21 has a cavity 21a toward the top of one side surface (i.e., the right side surface in FIG.

2A) adjacent to the front side. The device housing 21 also has an openable-closable door 21b at the front side.

In this example, as shown in FIG. 2B, examples of components used for image formation include an imaging engine 30 that is installed in an upper region within the device housing 21 and that forms an image onto a medium S, such as a sheet, a medium feeding unit 40 that is installed in a lower region within the device housing 21 and that feeds the medium S, such as a sheet, toward the imaging engine 30, an output medium receiver 50 that is provided by utilizing the cavity 21a of the device housing 21 and to which the medium S having the image formed thereon in the imaging engine 30 is output, a medium transport unit 60 that transports the medium S fed from the medium feeding unit 40 to the output medium receiver 50 via the imaging engine 30, and an operation panel 70 provided at the top of the device housing 21 and used for performing an operation for causing a controller (not shown) that controls the imaging engine 30, the medium feeding unit 40, and the medium transport unit 60 to perform an image forming process.

In this example, the imaging engine 30 includes multiple image forming units 31 that form multiple color component images onto multiple photoconductors by, for example, electrophotography, an intermediate transfer member 32 that has, for example, a belt-like shape and to which the color component images formed by the image forming units 31 are first-transferred so as to be transported, a transfer unit 33 that transfers the first-transferred images on the intermediate transfer member 32 onto the medium S, and a fixing unit 34 that fixes the images transferred on the medium S onto the medium S. However, the configuration of the imaging engine 30 is not limited to that described above.

In this example, the medium feeding unit 40 includes three medium feeders 40a to 40c. In particular, the medium feeder 40c located at the lowermost level accommodates and feeds a standard-size (e.g., A4) medium S. The number and the layout of medium feeders may be appropriately changed, and a medium feeder of a manual feed type may be added, where appropriate.

Furthermore, design changes may also be appropriately made with respect to the output medium receiver 50 in accordance with the output position of the medium S. Moreover, as an alternative to this example in which the medium transport unit 60 employs a transport method for forming an image onto one face of the medium S, a duplex transport module may be added so that images may be formed on both faces of the medium S.

Casters

In this example, for example, as shown in FIGS. 3 to 6B, each caster 22 is constituted by attaching an attachment plate 81 to the corresponding one of four corners on the underside of the base of the device housing 21, providing the attachment plate 81 with a wheel holder 82 in a rotatable manner with a bearing (not shown) interposed therebetween, and using the wheel holder 82 to hold a shaft 84 of a pair of wheels 83 in a rotatable manner.

Reference sign 85 denotes a stopper for each caster 22.

Configuration Example of Device Housing

Configuration Example of Base of Device Housing

In this example, as shown in FIGS. 2A to 4, the base of the device housing 21 has a substantially rectangular bottom plate 90. Excluding the front side of the bottom plate 90, a left frame member 91, a right frame member 92, and a rear frame member 93 are respectively fixed to the left, right, and rear sides by, for example, soldering. Furthermore, the bottom plate 90 has a substantially cross-sectionally U-shaped recess 94 in a region between the casters 22 located at the left and right sides. The recess 94 is not in contact with the casters 22, extends in the front-rear direction, and is recessed downward. A front frame member 95 is fixed to the front side of the bottom plate 90 by, for example, soldering in a state where the front frame member 95 is not in contact with an installation surface 18 (see FIG. 2B).

The shapes and cross-sectional structures of the frame members 91 to 93 and 95 may be selected as appropriate. In this example, each of the left and right frame members 91 and 92 and the rear frame member 93 is appropriately selected from a cross-sectionally U-shaped member, a cross-sectionally L-shaped member, or a closed-sectional member.

The front frame member 95 has a rectangular flat plate 95a extending longitudinally in the left-right direction. The upper edge of the flat plate 95a is provided with a U-shaped cutout 95b that surrounds the recess 94 of the bottom plate 90, whereas the lower edge of the flat plate 95a is provided with a substantially L-shaped first bent portion 95c bent at an angle smaller than 90° relative to the flat plate 95a within a range corresponding to the region of the recess 94 of the bottom plate 90. At the lower edge of the flat plate 95a, sections excluding the region of the recess 94 of the bottom plate 90 are provided with second bent portions 95d whose bent area gradually decreases from sections adjacent to the first bent portion 95c to form a substantially triangular shape, and are also provided with third bent portions 95e that are adjacent to the second bent portions 95d, that are bent into a substantially L-shape, and whose bent area substantially equal to the minimal bent area of the second bent portions 95d is short.

With regard to the front frame member 95, the flat plate 95a is soldered to the front edge of the recess 94 of the bottom plate 90, and the distal edge of the first bent portion 95c is soldered to the outer surface at the base of the recess 94 of the bottom plate 90.

Configuration Example of Components Excluding Base of Device Housing

Four pillar frame members 100 extending upward in the vertical direction are fixed to the four corners of the base of the device housing 21. Of regions surrounding the spaces between the four pillar frame members 100, the left, right, and rear sides excluding the front side have a left side plate 101, a right side plate 102, and a rear side plate 103 fixed thereto by soldering or by using fasteners, such as screws. In this example, the front side of a lower region of the device housing 21 is provided with an opening such that, for example, when the medium S is to be resupplied after the openable-closable door 21b (see FIG. 2A) is opened, the medium feeders 40a to 40c of the medium feeding unit 40 are accessible.

The pillar frame members 100 are appropriately provided with, for example, attachment brackets 105 for installing the medium feeding unit 40, as well as reinforcement tie rods 106.

Caster Protection Structure

In this exemplary embodiment, a structure for protecting the casters 22 is employed by using a frame member, specifically, the front frame member 95, constituting the base of the device housing 21, as shown in FIGS. 3 to 6B, so that if the casters 22 collide with an obstacle when the image forming device 20 is transported, damage to the casters 22 may be suppressed.

Specifically, in this example, the front frame member 95 constituting the base of the device housing 21 functions as a protection member H serving as a protector for protecting the casters 22.

In this example, the front frame member 95 basically has the flat plate 95a, the cutout 95b, and the first to third bent portions 95c to 95e, as described above. A relative positional relationship that the front frame member 95 has with the casters 22 is selected as follows.

Figure 5:
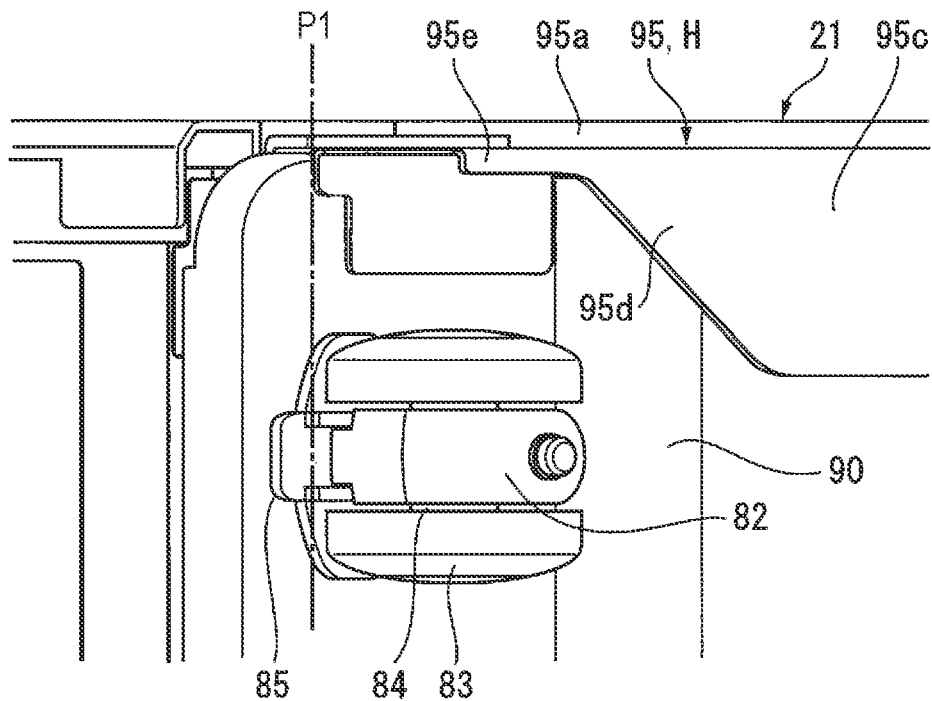
FIG. 5 is a diagram as viewed from a direction indicated by an arrow V in FIG. 4.
Figure 6A:
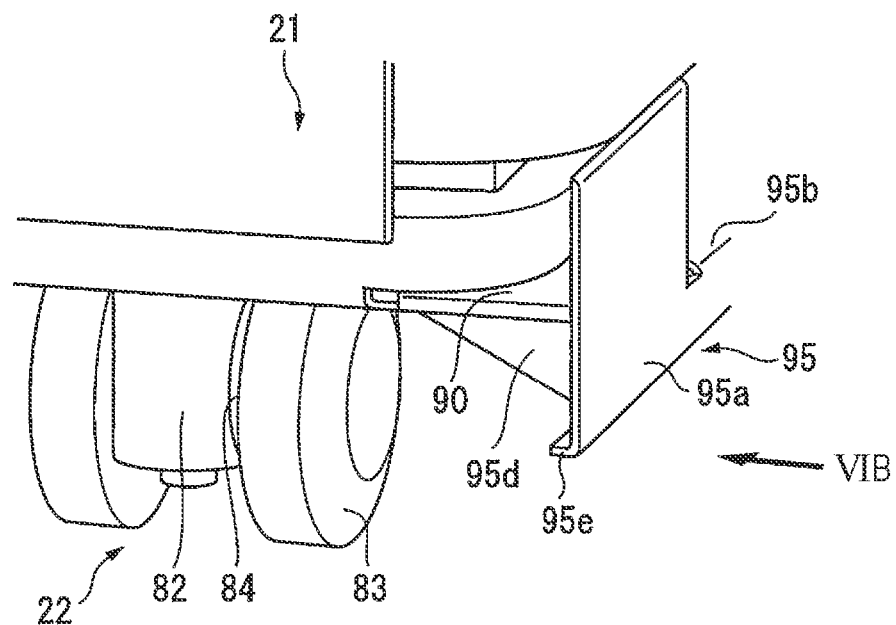
FIG. 6A is a perspective view illustrating a relevant part of a caster protection structure according to the first exemplary embodiment.
Figure 6B:
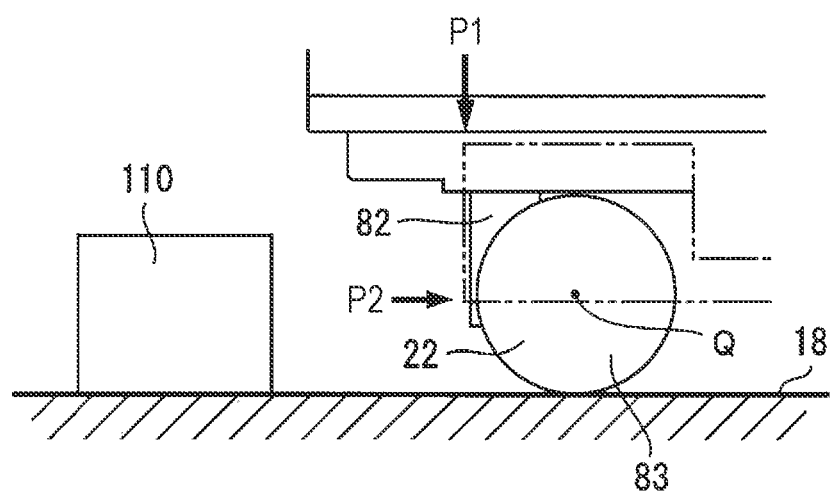
FIG. 6B is a diagram as viewed from a direction indicated by an arrow VIB in FIG. 6A.

1. As shown in FIGS. 5 and 6B, the longitudinal end position P1 of the front frame member 95 is disposed in an outer region located beyond an outer lateral edge position of each caster 22.

The outer lateral edge position of the caster 22 refers to a position where the outermost lateral edge of any one of the components (such as the wheel holder 82 and the wheels 83) of the caster 22 is disposed. However, in the case of the stopper 85 serving as one of the components, since the stopper 85 is a movable component, a case where the locking position of the stopper 85 does not correspond to the outer lateral edge position of the caster 22 is to be excluded even if the stopper 85 is located at the outer later edge position of the caster 22 when the stopper 85 is unlocked.

A first condition corresponds to a case where the longitudinal end position P1 of the front frame member 95 is aligned with the outer lateral edge position of the caster 22.

When the caster 22 collides with an obstacle 110 under this condition, the distal end of the front frame member 95, specifically, the distal end of the flat plate 95a, collides with the obstacle 110 simultaneously with the caster 22. Thus, the impact force caused by the collision is distributed to the caster 22 and the front frame member 95, so that the impact force applied to the caster 22 is reduced accordingly, whereby deformation of the caster 22 may be suppressed.

In this condition, the part of the front frame member 95 that collides with the obstacle 110 is the flat plate 95a. However, since the front frame member 95 receives the impact force during the collision with the obstacle 110 in the longitudinal direction, the rigidity of the front frame member 95 is higher than that of the caster 22, and the impact force applied to the caster 22 may be reduced.

A second condition corresponds to a case where the longitudinal end position P1 of the front frame member 95 is disposed outward relative to the outer lateral edge position of the caster 22.

When the caster 22 collides with the obstacle 110 under this condition, the distal end of the front frame member 95, specifically, the distal end of the flat plate 95a, collides with the obstacle 110 first. Therefore, in this example, a situation where the caster 22 collides with the obstacle 110 may be avoided.

In this condition, even if the image forming device is transported diagonally relative to the longitudinal direction of the front frame member 95 or there is an assembly error in the device housing 21 or the caster 22, a situation where the caster 22 alone collides with the obstacle 110 may be avoided, and the front frame member 95 may be made to collide with the obstacle 110 before the caster 22.

2. The longitudinal ends of the front frame member 95 are disposed with a distance from the casters 22 such that the longitudinal ends are non-contactable with the casters 22 when the casters 22 rotate in any direction.

In this example, as shown in FIG. 5, the relative positional relationship between the flat plate 95a of the front frame member 95 and each caster 22 is such that a distance is set therebetween to maintain a non-contact state. Furthermore, with regard to the front frame member 95, although the second bent portions 95d and the third bent portions 95e are disposed near the casters 22, the second bent portions 95d and the third bent portions 95e have sufficiently smaller bent areas than the first bent portion 95c.

Therefore, there may be no concern that the front frame member 95 and the casters 22 interfere with each other.

3. The lower end position P2 of each longitudinal end of the front frame member 95 is disposed in a lower region below the center position Q of the corresponding caster 22 (corresponding to the center position of the shaft 84 of the wheels 83).

As compared with a case where the lower end position P2 of each longitudinal end of the front frame member 95 is disposed above the center position Q of the corresponding caster 22, the front frame member 95 may be prevented from becoming a hindrance to the caster 22 moving over the obstacle 110, so that the caster 22 may be effectively protected.

In particular, disposing the lower end position P2 of each longitudinal end of the front frame member 95 below the center position Q of the corresponding caster 22 may be further effective for protecting the caster 22.

4. The front frame member 95 has the U-shaped cutout 95b surrounding the recess 94 of the bottom plate 90 and maintains the rigidity of the front edge of the bottom plate 90.

In this example, the bottom plate 90 is preliminarily provided with the recess 94, and the bottom plate 90 ensures the rigidity of the surrounding area by using the front frame member 95 together with the left frame member 91, the right frame member 92, and the rear frame member 93.

Therefore, the recess 94 of the bottom plate 90 may be effectively utilized as an accommodation section of, for example, the medium feeder 40c of the medium feeding unit 40.

5. The front frame member 95 is further disposed in front of the casters 22 located at the front side.

In this example, the front frame member 95 suppresses damage caused as a result of the casters 22 colliding with the obstacle 110 at the longitudinal ends. In addition, the casters 22 are hidden by the flat plate 95a from the front side so that, for example, when the user operates the device, a situation where the user's toes touch the casters 22 may be prevented.

6. The opposite longitudinal ends of the front frame member 95 have a structure for protecting the casters 22 located at the opposite sides.

This example is effective for protecting multiple casters 22 with a single front frame member 95.

7. The front frame member 95 includes the first to third bent portion 95c to 95e in addition to the flat plate 95a, and may have higher rigidity at the front edge of the bottom plate 90, as compared with a structure having the flat plate 95a alone.

Specifically, the flat plate 95a is fixed to the front edge of the bottom plate 90, and the first bent portion 95c is fixed to the underside of the base of the recess 94 of the bottom plate 90 so as to form a closed-sectional structure with the bottom plate 90 relative to the front side of the bottom plate 90. Therefore, the support rigidity of the bottom plate 90 at the front side thereof may be increased.

Furthermore, in this example, the longitudinal ends of the front frame member 95 have a cross-sectionally L-shape formed by the flat plate 95a and the third bent portions 95e, so that the rigidity may be increased, as compared with a case where the third bent portions 95e are not provided, whereby an impact from the obstacle 110 may be received without deformation accordingly.

Figure 7A:
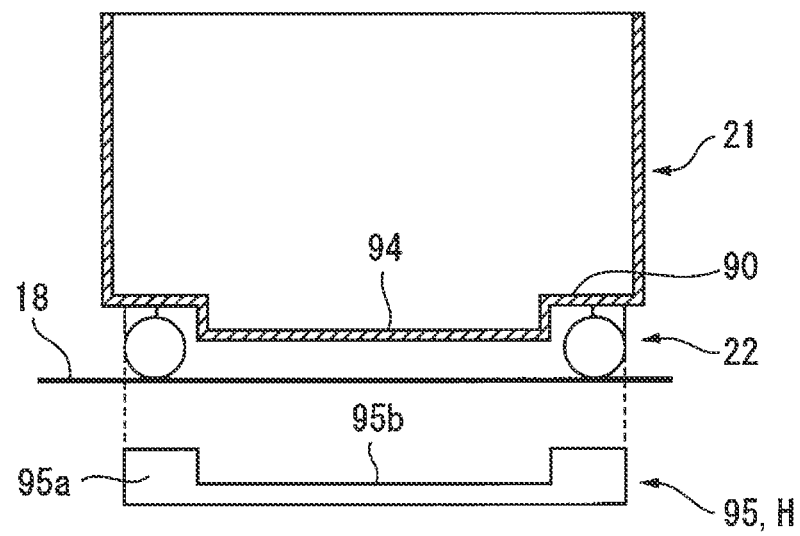
FIG. 7A schematically illustrates the caster protection structure according to the first exemplary embodiment, FIG. 7B schematically illustrates a caster protection structure according to a first modification.

In this exemplary embodiment, as shown in FIG. 7A, the front frame member 95 functions as the protection member H for the casters 22. Alternatively, for example, first and second modifications to be described below are also possible.

First Modification

Figure 7B:
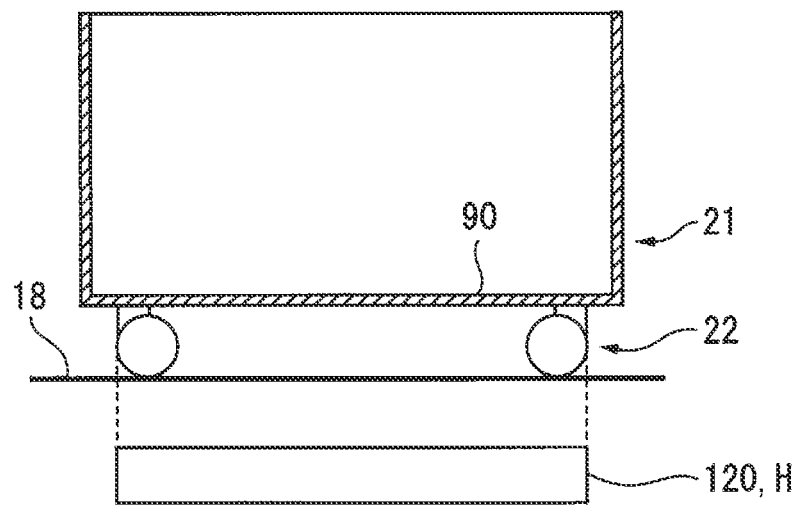
FIG. 7C schematically illustrates a caster protection structure according to a second modification.

For example, in a case where the bottom plate 90 at the base of the device housing 21 does not have the recess 94, a long plate member without a cutout may be used as a front frame member 120 to protect the casters 22, as shown in FIG. 7B.

In this case, for example, assuming that the front frame member 120 at the front side of the bottom plate 90 ensures the rigidity at the base of the device housing 21 but has a shape that may be difficult to protect the casters 22, an additional plate-like member functioning as the protection member H may be additionally fixed to a part of the front frame member 120, so that the front frame member 120 may additionally function as the protection member H.

Second Modification

Figure 7C:
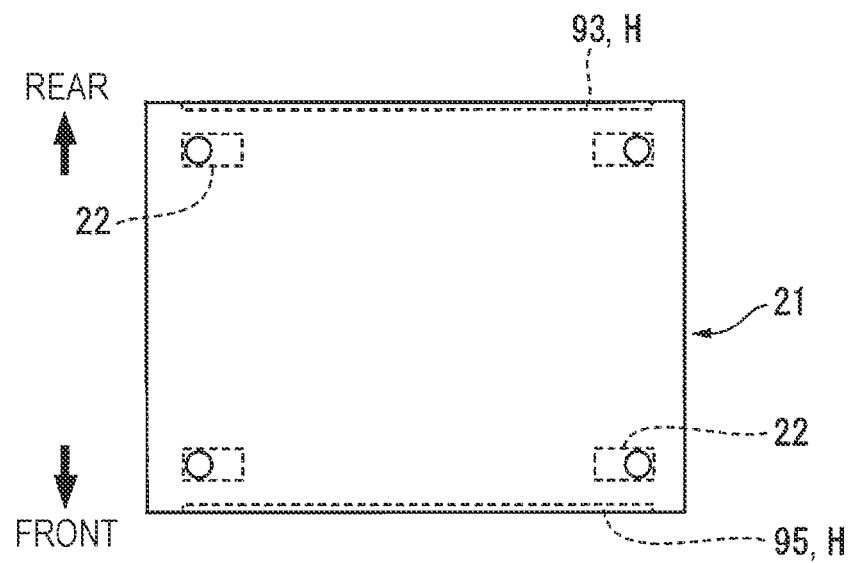

As an alternative to this exemplary embodiment in which the front frame member 95 functions as the protection member H, the rear frame member 93 may also function as the protection member H for the casters 22 in addition to the front frame member 95, as shown in FIG. 7C. In a case where the rear frame member 93 functions as the protection member H, the originally-used rear frame member 93 may be provided with an additional member or may be replaced with a rear frame member 93 that functions as the protection member H.

A first comparative example will be described below for evaluating the performance of the caster protection structure according to this exemplary embodiment.

First Comparative Example

Figure 8A:
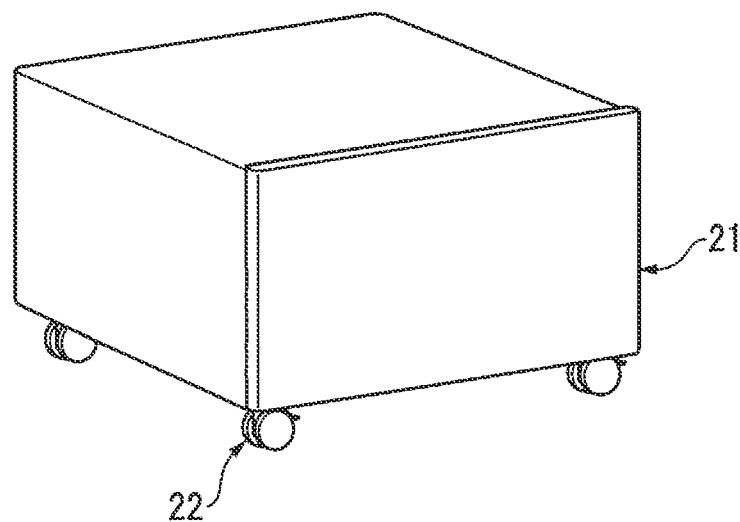
FIG. 8A illustrates a housing structure not having a caster protection structure according to a first comparative example, FIG. 8B schematically illustrates a situation where a caster shown in FIG. 8A collides with an obstacle, and FIG. 8C schematically illustrates a caster protection structure used in the first comparative example.
Figure 8B:
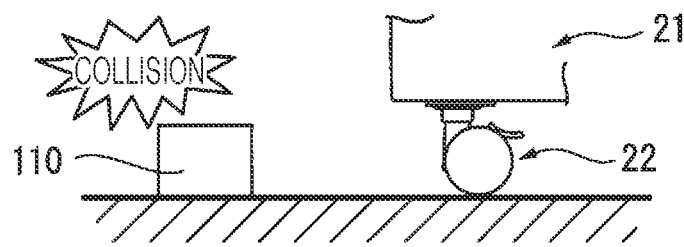

FIGS. 8A and 8B illustrate an example not having a caster protection structure.

In this example, when the casters 22 collide with the obstacle 110, the casters 22 may possibly break.

Figure 8C:
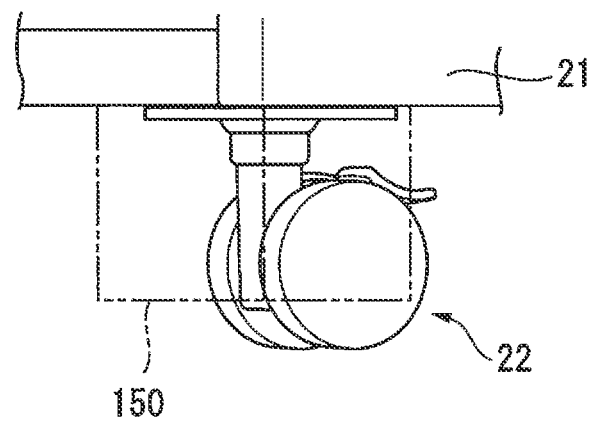

In order to avoid such a situation, the first comparative example has, for example, L-shaped guard components 150 serving as dedicated protection members that surround the casters 22 at the base of the device housing 21 from the outside, as shown in FIG. 8C.

This example is additionally provided with the guard components 150 and also does not have components for supporting the guard components 150. Thus, when the guard components 150 collide with the obstacle 110, the guard components 150 may deform, possibly becoming a hindrance to the rotation of the casters 22 or interfering with the casters 22.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A caster protection structure that protects a caster provided at a base of a housing and used for transporting the housing in a movable manner, the caster protection structure comprising:
    a frame member that is provided at the base of the housing, serves as a part of a frame constituting the base of the housing, and extends in a predetermined direction, wherein the predetermined direction extends along at least one of outer side surfaces of the housing, and the predetermined direction comprising a diagonal direction,
    wherein the frame member comprises a flat plate, a U-shaped cutout provided on an upper edge of the flat plate, and a bent portion provided on a lower edge of the flat plate,
    wherein a longitudinal end position of the frame member is disposed in an outer region located beyond an outer lateral edge position of the caster.

2. The caster protection structure according to claim 1, wherein the longitudinal end position of the frame member is disposed outward relative to the outer lateral edge position of the caster.

3. The caster protection structure according to claim 2, wherein a longitudinal end of the frame member is disposed with a distance from the caster such that the longitudinal end is non-contactable with the caster when the caster rotates in any direction.

4. The caster protection structure according to claim 1, wherein a longitudinal end of the frame member is disposed with a distance from the caster such that the longitudinal end is non-contactable with the caster when the caster rotates in any direction.

5. The caster protection structure according to claim 1, wherein the frame member is provided along one edge of the base of the housing and is located at an outer side of the caster with respect to a direction intersecting a longitudinal direction of the frame member.

6. The caster protection structure according to claim 1, wherein the caster includes a plurality of casters provided at corners of the base of the housing, and
    wherein the base of the housing has a recess that is recessed downward in a region between the casters, and
    wherein the U-shaped cutout surrounds the recess and the frame member extends in a longitudinal direction.

7. The caster protection structure according to claim 1, wherein the caster includes a plurality of casters that are provided at opposite corners on one edge of the base of the housing and that are protected by opposite longitudinal ends of the frame member.

8. The caster protection structure according to claim 1, wherein a lower end position of a longitudinal end of the frame member is disposed in a lower region below a center position of the caster.

9. The caster protection structure according to claim 8, wherein the lower end position of the longitudinal end of the frame member is disposed downward relative to the center position of the caster.

10. A housing structure comprising:
    a housing;
    a caster that is provided at a base of a housing and that is used for transporting the housing in a movable manner; and
    a caster protector that has a frame member extending in a predetermined direction and serving as a part of a frame constituting the base of the housing, wherein the predetermined direction extends along at least one of outer side surfaces of the housing, and the predetermined direction comprising a diagonal direction, wherein the frame member comprises a flat plate, a U-shaped cutout provided on an upper edge of the flat plate, and a bent portion provided on a lower edge of the flat plate, wherein a longitudinal end position of the frame member is disposed in an outer region located beyond an outer lateral edge position of the caster.

11. An article comprising:

the housing structure according to claim 10; and various types of article components that are mounted in the housing structure.

12. A caster protection structure that is provided at a base of a housing and that protects a caster used for transporting the housing in a movable manner, the caster protection structure comprising:

frame means serving as a part of a frame constituting the base of the housing, the frame means being provided at the base of the housing and extending in a predetermined direction, wherein the predetermined direction extends along at least one of outer side surfaces of the housing, and the predetermined direction comprising a diagonal direction, wherein the frame means comprises a flat plate, a U-shaped cutout provided on an upper edge of the flat plate, and a bent portion provided on a lower edge of the flat plate, wherein a longitudinal end position of the frame means is disposed in an outer region located beyond an outer lateral edge position of the caster.

* * * * *